Aug. 30, 1949.  J. SPARGO  2,480,614
INDICATOR PANEL WITH SLIDABLE INDICATOR
Filed July 29, 1944
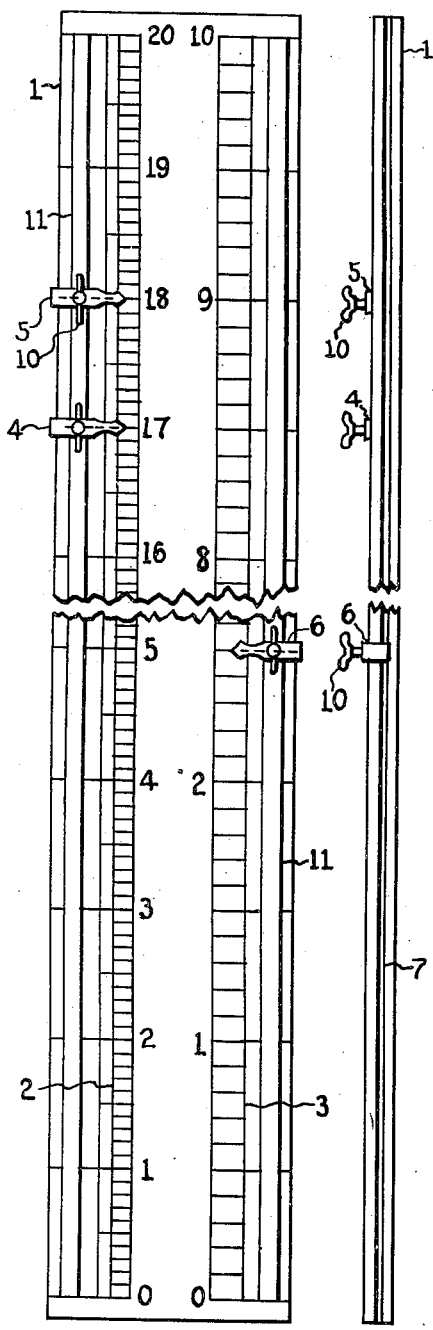
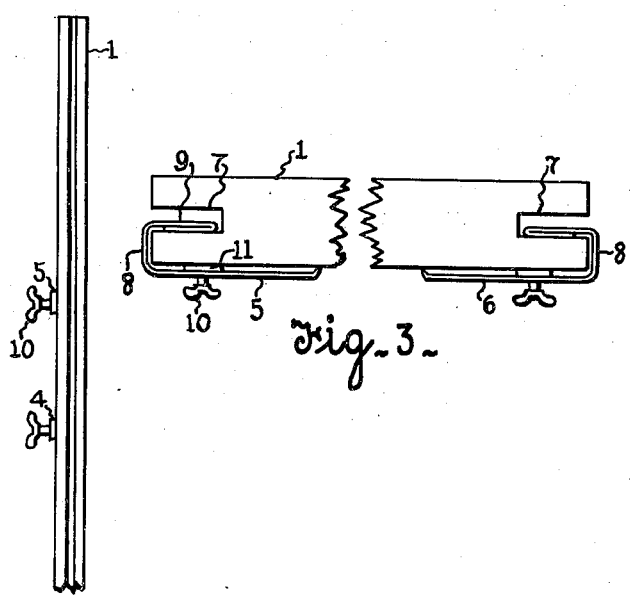
Fig.-1-   Fig.-2-   Fig.-3-   Fig.-4-
Inventor
John Spargo
J. S. Murray
Attorney Patented Aug. 30, 1949

2,480,614

UNITED STATES PATENT OFFICE 2,480,614

INDICATOR PANEL WITH SLIDABLE INDICATOR

John Spargo, Detroit, Mich., assignor of one-half to Emil A. Mader, Detroit, Mich.

Application July 29, 1944, Serial No. 547,262

4 Claims. (Cl. 116—135)

This invention relates to systems for increasing the efficiency of production employees by bonuses or incentive pay, and relates particularly to visual indicators of the working of such systems.

An object of the invention is to provide an indicating board or panel carrying two monetary scales, one reading in product values and the other in bonus amounts, pointers being movable along said scales, so that the aggregate value of products produced over a certain working period may be progressively indicated and also the resulting bonus, if any.

Another object is to associate two pointers with said scale of product values, one to remain fixed and show the quota above which a bonus is earned, while the other is shifted at suitable time intervals to show the progressive increase of product valuation over a certain working interval, as a week or month.

A further object is to provide a convenient means for mounting the several pointers movably on the indicator panel and for holding them independently adjusted.

These and various other objects are attained by the construction hereinafter described and illustrated in the accompanying drawing, wherein:

Fig. 1 is a view of the improved indicator, in front elevation.

Fig. 2 is a view of the indicator in edge elevation.

Fig. 3 is an enlarged end view of the panel.

Fig. 4 is a fragmentary enlarged end view of a panel, disclosing a modified provision for installing a pointer.

In these views, the reference character 1 designates an elongated panel which may be formed of a single board, as shown, or may be an assemblage of boards or sheets. Extending approximately the full length of said panel on its front face are two scales 2 and 3, the main units of the scale 2 reading in thousands of dollars and being subdivided to indicate hundreds. The main units of the scale 3 read preferably in hundreds of dollars and have subdivisions indicating $10.00 each. The maximum indications of the two scales must depend on various factors as the size of the working force whose activities are to be represented on the indicator and the value of the particular products of such force. The exemplified indicator is suited to indicate an aggregate production value up to $20,000.00 and a bonus up to $1,000.00.

Pointers 4 and 5 are movable along the scale 2 and a pointer 6 along the scale 3, the pointers 4 and 5 preferably differing materially in color, being thus readily distinguished, one from the other. The pointer 4 is set to indicate a predetermined production quota for a month or other working period, it being necessary to exceed this quota before a bonus is earned. The quota is determined in adopting my system, by the past performance of the production force, averaged over a suitable period, as for example a year. Thus, if the system is operated on a monthly basis, and it is found that products have averaged a valuation of $17,000.00 per month, this amount may reasonably serve as a quota, provided the labor cost has been a constant. The pointer 5 is returned to zero setting at commencement of each calendar month or other work period, and is periodically moved up as the value of products for the month mounts through continued production.

The pointer 6 remains at zero of the scale 3 until a bonus is earned and is moved up as the bonus increases from day to day. With the pointers positioned as in Fig. 1, the quota indicated by the pointer 4 is $17,000.00 and a product value of $18,000.00 is shown by the pointer 5. Hence the quota has been exceeded by $1,000.00 and the resulting bonus is determined by the ratio between labor cost and the corresponding product valuation. This ratio, of course, varies in different factories, and is assumed to be one to four for purposes of the accompanying drawing. Hence the bonus corresponding to a production exceeding the quota by $1,000.00 will be one fourth of that amount or $250.00, the amount indicated by the pointer 6.

In the construction shown in Figs. 1, 2 and 3, the vertical edges of the board which forms the panel 1 are grooved as indicated at 7, and the pointers each integrally project from U-shaped supports 8, each having a rear leg 9 inserted in the adjacent groove 7. The front leg of each U-shaped support is engaged by a thumbscrew 10, and a pair of metal strips 11 are extended substantially the full length of the panel on its front face for clamping engagement by the thumb screws. Thus the pointers may be individually secured at any desired height on the panel, and the pointer 5 may be completely removed from the panel in shifting it past the pointer 4.

In the modified construction shown in Fig. 4, the illustrated pointer 12 is formed by one end portion of an elongated metal strip, the other end portion of which forms an approximately U-shaped curved spring 13 inserted in a groove 14 in the vertical edge of the panel board. A mid portion of said strip is folded upon itself to form a handle 15 outwardly projecting from the edge of the board for conveniently shifting the pointer. The spring 13 bears upon opposed walls of the groove 14 with sufficient pressure to hold the pointer firmly in any position of selective adjustment. Preferably a vertically elongated strip 16 is secured to the edge of the board rearwardly of the groove 14, and slightly obstructs the groove to engage a shoulder 17 formed on the spring 13, thus preventing accidental escape of the spring from the groove.

It has been found that the described indicator, when prominently displayed in a shop, affords a considerable incentive to production and materially reduces absenteeism. The workmen may at any time observe whether the quota is being approached or exceeded and in case a bonus has been earned, they are informed as to the increase of such bonus from day to day.

Distribution of the bonus may follow any equitable system, depending primarily of course on the number of hours each employee has worked during the time interval covered by the bonus.

What I claim is:

1. In an indicator, an elongated panel having a graduated scale extended lengthwise thereof and having in one of its longitudinal edges a groove substantially coextensive with such scale, a pointer in an indicating relation to said scale, and a resilient support for said pointer inserted in and slidable lengthwise of the groove, and yieldably bearing against opposite walls of the groove to hold the pointer selectively adjusted.

2. An indicator as set forth in claim 1, said support being removable from the groove in any sliding position of said support.

3. In an indicator, an elongated panel having a grooved edge face and a graduated scale extended lengthwise of the panel on its front face, and a member slidable lengthwise of the panel in said groove and comprising a pointer coacting with said scale and further comprising means for holding said pointer in a selective sliding position, said member being detachable from the panel in any of its selective positions.

4. In an indicator, the combination with a panel having an elongated groove and a scale extending in substantial parallelism with said groove, of a slide formed by a strip of metal having an end portion bent to form a spring bearing against opposed walls of the groove, having another end portion forming a pointer coacting with said scale, and having a handle-forming portion between said end portions, projecting from said panel.

JOHN SPARGO.

REFERENCES CITED

The following references are of record in the file of this patent:

UNITED STATES PATENTS

| Number | Name | Date |
|---|---|---|
| 132,553 | Wormald | Oct. 29, 1872 |
| 923,937 | Bernst | June 8, 1909 |
| 1,116,112 | Pierce | Nov. 3, 1914 |
| 1,265,839 | Walden | May 14, 1918 |
| 1,676,060 | Spinella | July 3, 1928 |
| 1,773,670 | Girlich | Aug. 19, 1930 |
| 2,118,675 | Jackson | May 24, 1938 |
| 2,248,161 | Cross | July 8, 1941 |
| 2,344,198 | Barnard | Mar. 14, 1944 |

FOREIGN PATENTS

| Number | Country | Date |
|---|---|---|
| 296,750 | Italy | May 23, 1932 |
| 352,414 | Italy | Sept. 14, 1937 |
| 664,002 | Germany | Dec. 15, 1935 |